(12) United States Patent
Bobinet et al.

(10) Patent No.: US 11,804,146 B2
(45) Date of Patent: Oct. 31, 2023

(54) HEALTHY HABIT AND ITERATION ENGINE

(71) Applicant: Fresh Tri, Inc., Felton, CA (US)

(72) Inventors: Kyra Bobinet, Felton, CA (US); Brian Garcia, Highlands Ranch, CO (US); Nathaniel Hershey, Denver, CO (US); Keenan Isaac Mersky Walch, San Diego, CA (US)

(73) Assignee: Fresh Tri, Inc., Felton, CA (US)

( * ) Notice: Subject to any disclaimer, the term of this patent is extended or adjusted under 35 U.S.C. 154(b) by 569 days.

(21) Appl. No.: 16/571,031

(22) Filed: Sep. 13, 2019

(65) Prior Publication Data
US 2020/0090544 A1    Mar. 19, 2020

Related U.S. Application Data

(60) Provisional application No. 62/731,796, filed on Sep. 14, 2018.

(51) Int. Cl.
*G09B 19/00*   (2006.01)
*G06F 16/28*   (2019.01)

(52) U.S. Cl.
CPC ......... *G09B 19/00* (2013.01); *G06F 16/288* (2019.01)

(58) Field of Classification Search
None
See application file for complete search history.

(56) References Cited

U.S. PATENT DOCUMENTS

| | | | |
|---|---|---|---|
| 9,171,048 B2 | 10/2015 | Brust et al. | |
| 9,302,179 B1* | 4/2016 | Merzenich | G09B 5/00 |
| 10,232,172 B1* | 3/2019 | O | A61B 5/4836 |
| 2012/0123806 A1 | 5/2012 | Schumann et al. | |
| 2013/0172691 A1 | 7/2013 | Tran | |
| 2013/0254035 A1 | 9/2013 | Ramer et al. | |
| 2016/0321946 A1 | 11/2016 | Kim | |
| 2016/0333421 A1 | 11/2016 | Boutros et al. | |
| 2017/0132395 A1* | 5/2017 | Futch | G06Q 40/08 |
| 2017/0323368 A1 | 11/2017 | Eastman | |

(Continued)

OTHER PUBLICATIONS

International Search Report and Written Opinion of the International Searching Authority directed to related International Patent Application No. PCT/US2019/051164, dated Dec. 4, 2019; 7 pages.

(Continued)

*Primary Examiner* — James B Hull
(74) *Attorney, Agent, or Firm* — Sterne, Kessler, Goldstein & Fox P.L.L.C.

(57) ABSTRACT

Disclosed herein are system, method, and device embodiments for implementing a habit forming system. A habit forming service receives habit selection information from a habit forming application, determines a maturity measurement of a user based on a human behavior model, and determines a recommendation score of a behavior associated with the habit. Further, the habit forming service encodes the behavior onto a behavior taxonomy as a traversal path based on the maturity measurement, the recommendation score, and historic habit formation information, and identifies the behavior as a preferred behavior based on an attribute of the traversal path.

25 Claims, 6 Drawing Sheets

(56) References Cited

U.S. PATENT DOCUMENTS

2018/0150522 A1* 5/2018 Moskwinski ..... G06F 16/24575

OTHER PUBLICATIONS

International Preliminary Report on Patentability directed to related International Patent Application No. PCT/US2019/051164, dated Mar. 9, 2021; 6 pages.

"Habit Tracker—Apps on Google Play," accessed at https://play.google.com/store/apps/details?id=com.oristats.habitbull on Aug. 27, 2018; 5 pages.

"Persistence—Goal and Habit Tracker and Motivator on the App Store," accessed at https://itunes.apple.com/us/app/persistence-goal-and-habit-tracker-andmotivator/id789890932?mt=8 on Aug. 27, 2018; 3 pages.

"Goal Meter: Goal Tracker, Habit Changer,To-Do List—Apps on Google Play," accessed at https://play.google.com/store/apps/details?id=com.goalmeterapp.www on Aug. 27, 2018; 4 pages.

"Goal Tracker & Habit List—Apps on Google Play," accessed at https://play.google.com/store/apps/details?id=info.intrasoft.habitgoaltracker on Aug. 27, 2018; 4 pages.

* cited by examiner

HEALTHY HABIT AND ITERATION ENGINE

CROSS-REFERENCE TO RELATED APPLICATION

This application claims the benefit of U.S. Provisional Patent Application No. 62/731,796 filed on Sep. 14, 2018, which is incorporated by reference herein in its entirety.

BACKGROUND

Individuals often set out to make changes in their lives by focusing on an outcome. They may even begin to believe their self-worth is dependent upon their ability to achieve said outcome. This mindset often leads to failure and can even prevent a person from accomplishing other goals as they may personally identify with the inability to bring forth positive change in their lives. A more productive approach entails forming a new habit by focusing on practicing a new behavior, while understanding that the failure to form the new habit is ultimately the failure of the practiced behavior not that of the individual.

Similarly, many life improvement applications are outcome based, and fail to help users establish positive habits. Typically, these applications do not focus on the behaviors that establish healthy habits, much less identify the behaviors a specific user can practice in order to quickly and comfortably bring about positive change in their life. In some instances, the failure to focus on behavior may be due to the inability of recommendation engines to accurately identify the appropriate behaviors for successfully establishing a habit, and/or components of behaviors that are successful in helping a user establish a habit.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
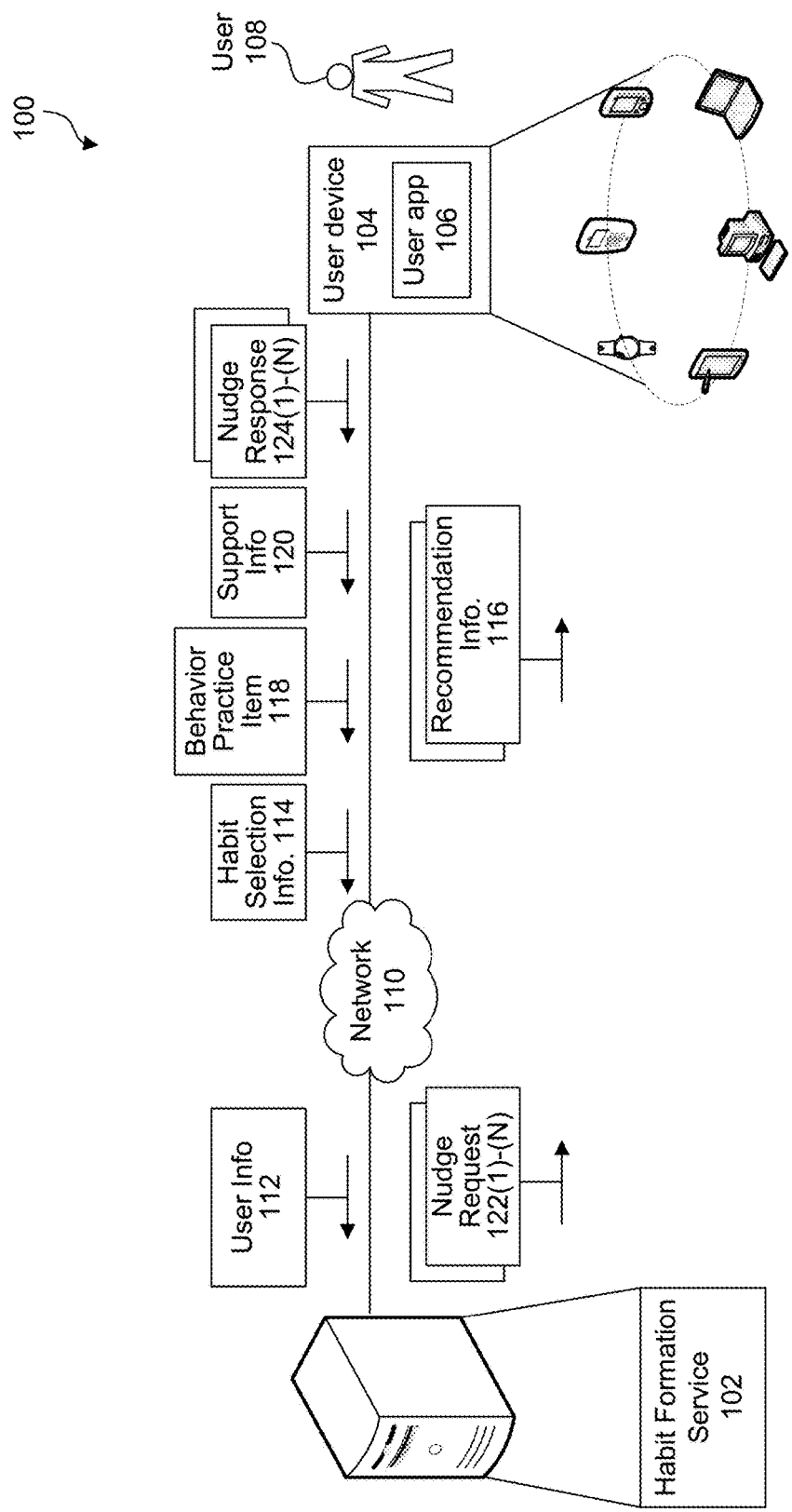
FIG. 1 is a block diagram of an example framework for implementing a habit forming system, according to some embodiments.

FIG. 1 illustrates a block diagram of an example framework for implementing a habit forming system 100, according to some embodiments. As illustrated in FIG. 1, the habit forming system 100 includes a habit forming service (HFS) 102 and a user device 104 including a habit forming app (HFA) 106. As shown in FIG. 1, the user device 104 is associated with a user 108. Further, as described herein, the user 108 may employ the HFS 102 and HFA 106 to form a new habit.

As used herein, a "habit" is a user behavior that has reached sustainability over a predefined time period and has automatic characteristics (i.e., the user may perform the behavior without forethought). In some embodiments, the predefined time period may be ten weeks. In some other embodiments, the predefined time period may be based at least in part on one or more attributes of the habit. A behavior is a discrete non-repetitive action performed by the user and may become a habit through practice. Further, an outcome is a result produced as a result of practicing a behavior. As described herein, habit formation may be facilitated from a behavior by providing a user with associated content and structure for performing the behavior (e.g., time of day, location, frequency, reminders, etc.) corresponding to a single subject area that represents an action for a person.

The HFS 102 and the HFA 106 may communicate via one or more communication networks 110. The communication network 110 may include any combination of a private network, personal area network (PAN), Local-Area Network (LAN), Wide-Area Network (WAN), or the Internet. Further, the connection between the HFS 102 and the HFA 106, and the communication network 110 may be a wireless connection (e.g., Bluetooth, Near Field Communication, Wi-Fi connection, etc.), or a wired connection (e.g., Ethernet, universal serial bus (USB), etc.), or a combination thereof.

Suppose the user 108 endeavors to form a new habit, the user 108 may install the HFA 106 on the user device 104. During a setup process of the HFA 106, the HFA 106 may collect user information 112 about the user 108, and send the user information 112 to the HFS 102 via the communication network 110. Additionally, or alternatively, the HFA 106 may actively and/or passively collect the user information 112 after the setup process is completed. Some examples of user information 112 include biographic information, employment information, demographic information, contact information, location information, medical records, wellness data, activity and health information, device information, authentication information, authorization information, etc. In some embodiments, the HFS 102 may collect diverse and complex data at a massive scale from a plurality of devices to organize the user information.

Once the HFA 106 has been installed on the user device 104, the user 108 may select the habit they would like to form using the HFA 106. For example, the user 108 may endeavor to eat healthy protein. As such, the user 108 may identify the habit to the HFA 106 via a graphical user interface (GUI) presented by the HFA 106. Further, the HFA 106 may generate habit selection information 114 identifying the selected habit and the user 108, and send the habit selection information 114 to the HFS 102. In some embodiments, the habit selection information 114 may also include textual information identifying the user's motivation for aspiring to form the habit. Additionally, in some embodiments, the HFA 106 may send the habit selection information 114 with accompanying user information 114 that may be used by the HFS 102 to process the habit selection information 114.

Upon receipt of the habit selection information 114, the HFS 102 may determine one or more recommended behaviors that the user 108 can practice in order to form the habit. For instance, the HFS 102 service may determine that the user 108 should consider at least one of replacing beef with leaner meats in daily meals, consuming plant-based proteins instead of animal-based protein, or consuming only free-range red meat in order to form the habit of eating healthy protein.

In some embodiments, the HFS 102 may determine the recommended behaviors based on an assessment of a user's propensity for forming a new habit, an efficacy and availability of the behavior for forming the habit, and application of prospective behaviors to a taxonomy structure. For instance, the HFS 102 may determine a maturity measurement based on a human behavior model. In some embodiments, the maturity measurement represents a user's ability to implement behavioral changes in order to form new habits. The maturity measurement may be determined based at least in part on the user information 112. In addition, the maturity measurement may be used to identify similarities between the user 108 and other users of the HFS 102 that have attempted to form the habit.

Additionally, the HFS 102 may determine a recommendation score of prospective behaviors that may be performed to form the habit. In some embodiments, the recommendation score may be calculated based on an availability value and an efficacy value. The availability value of a prospective behavior may represent a probability that the user 108 can perform the behavior. For instance, the availability value may represent the probability that the user 108 will be able to replace beef with leaner meats in daily meals.

In some embodiments, the availability value may be based at least in part on the maturity measurement. For example, the HFS 102 may determine the availability value of a behavior based on historical information corresponding to users having the same maturity measurement of the user 108. As a result, the availability value will represent the probability that users having the same maturity measurement as the user 108 can perform the behavior.

The efficacy value of a behavior may represent the historical success of the behavior in helping a user to form the selected habit. For instance, the efficacy value may represent success that other users have forming the habit of eating healthier meats by replacing beef with leaner meats in daily meals. In some embodiments, the efficacy value may be based at least in part on the maturity measurement. For example, the HFS 102 may determine the efficacy value of a behavior based on historical information corresponding to users having the same maturity measurement as the user 108. As a result, the efficacy value will represent the success that users having the same maturity measurement as the user 108 have had forming the same habit by performing the behavior. In addition, as described in detail herein, the HFS 102 may perform large scale data analysis on the user information 112 to determine the availability value or the efficacy value.

Further, the HFS 102 may map the prospective behaviors onto a directed graph via a taxonomy structure. As described in further detail herein, the ranks of the taxonomy structure may include locus, system, category, manipulation, and precision.

In some embodiments, the HFS 102 may leverage the maturity measurement and the recommendation score to determine a traversal path of a behavior over the directed graph. Further, the HFS 102 may identify the behaviors that are most successful and the elements of the most successful behaviors via the traversal path. For example, the traversal path corresponding to the behavior may be a traversal path comprising one or more vertices (i.e., discrete behavior elements) associated with behaviors frequently practiced by users that form the habit.

Additionally, the HFS may select the behaviors to recommend to the user 108 based at least in part on the behaviors identified as most successful and/or the elements identified as frequently belonging to successful behaviors. For instance, the HFS 102 may determine that consuming only free-range red meat should be recommended to the user 108 based at least in part on the coded representation of consuming only free-range red meat in the behavior taxonomy being the traversal path used by a large number of users to achieve the habit of eating healthier meat.

Once the HFS 102 determines the recommended behaviors, the HFS 102 may send recommendation information 116 to the HFA 106. The recommendation information 116 may include the recommended behaviors and preparation information for helping the user 108 form the habit from the recommended behaviors. In some embodiments, the preparation information may include one or more discrete behaviors the user 108 may perform prior to beginning the process of forming a habit. For example, the recommended behavior of consuming plant-based protein may be associated with preparation information suggesting the user 108 watch a video recipe for cooking meals with plant-based protein. The preparation information may also include content that may generally assist the user in performing the recommended behaviors. For example, the preparation information may include location information and user reviews of one or more local grocery shops where the user 108 may purchase plant-based protein food items.

Further, the HFA 106 may present the recommended behaviors and the preparation information to the user 108. Additionally, the HFA 106 may receive selection of one of the recommended behaviors from the user 108, and generate a behavior practice item 118 corresponding to the user's attempt to form the habit using the selected behavior. The behavior practice item 118 may include the selected habit, a textual description of the user's motivation for forming the habit, and the selected behavior. For instance, the user 108 may select the behavior of consuming only free-range red meat, and the HFA 106 may generate the behavior practice item 118 including the habit of eating healthier protein for the purpose of accomplishing a health goal via the behavior of consuming only free-range red meat. In some embodiments, the behavior practice item 118 may also include time information indicating a start date and an end date for the practice of the selected behavior by the user 108. Additionally, the HFA 106 may send the behavior practice item 118 to the HFS 102 via the communication network 110.

Additionally, the HFS 102 and HFA 106 may be configured to monitor and assist the user's performance of the selected behavior. In some embodiments, the HFA 106 may request the user 108 provide support information 120 indicating when the user 108 would prefer to receive automated assistance from the HFA 106 in practicing the behavior, and send the support information 120 to the HFS 102. Additionally, or alternatively, the HFS 102 may determine the most ideal date and times for providing automated assistance based upon the maturity measurement of the user 108, the user information 112, and/or the behavior practice item 118.

Further, the HFS 102 may be configured to aid the user 108 in performing the selected behavior. As shown in FIG. 1, the HFS 102 may send nudge requests 122(1)-(N) to the HFA 106 based on the support information 120. For example, the HFS 102 may send the nudge request 122(1) to the user device 104 at a date and time provided by the user 108 in the support information 120. The nudge requests 122(1)-(N) may include nudge information curated by the HFS 102 to support the user 108 in performing the selected behavior. Upon receipt of the nudge requests 122(1)-(N), the HFA 106 may present a graphical user interface (GUI) object that displays the nudge information as a reminder and/or encouragement to perform the selected behavior.

By focusing the attention of the user 108 on habit formation via performance of the selected behavior, the habit forming system 100 assists the user 108 in establishing an iterative mindset. Additionally, redirecting the focus of the user 108 away from an outcome-based approach helps the user 108 avoid the down-regulation of motivation, which may trigger the habenula in individuals (i.e., the neuroanatomic component responsible for regulating aversive motivational states and negative feedback processing).

Further, the HFA 106 may send nudge responses 124(1)-(N) to the HFS 102. In some embodiments, the nudge responses 124(1)-(N) may identify the response of the user 108 to the nudge requests 122(1)-(N). For example, the nudge response 124(1) may indicate whether the user 108 took some form of action with respect to the nudge request 122(1). In some embodiments, the HFS 102 may determine the efficacy value of a behavior based upon the nudge response 124. Additionally, the HFS 102 may determine the efficacy of the content of a nudge request 122 based upon its corresponding nudge response 124.

In addition, the HFS 102 and/or HFA 106 may be configured to determine whether the user 108 is performing the selected behavior for forming the habit. Further, the HFA 106 may be configured to send the user information 112 to the HFS 102 including information identifying whether performing the selected behavior helped the user 108 form the habit. For example, the HFA 106 may present a dialog to the user 108 asking whether the user 108 has abstained from consuming non-free range red meat within the last twenty-four hours.

Figure 2:
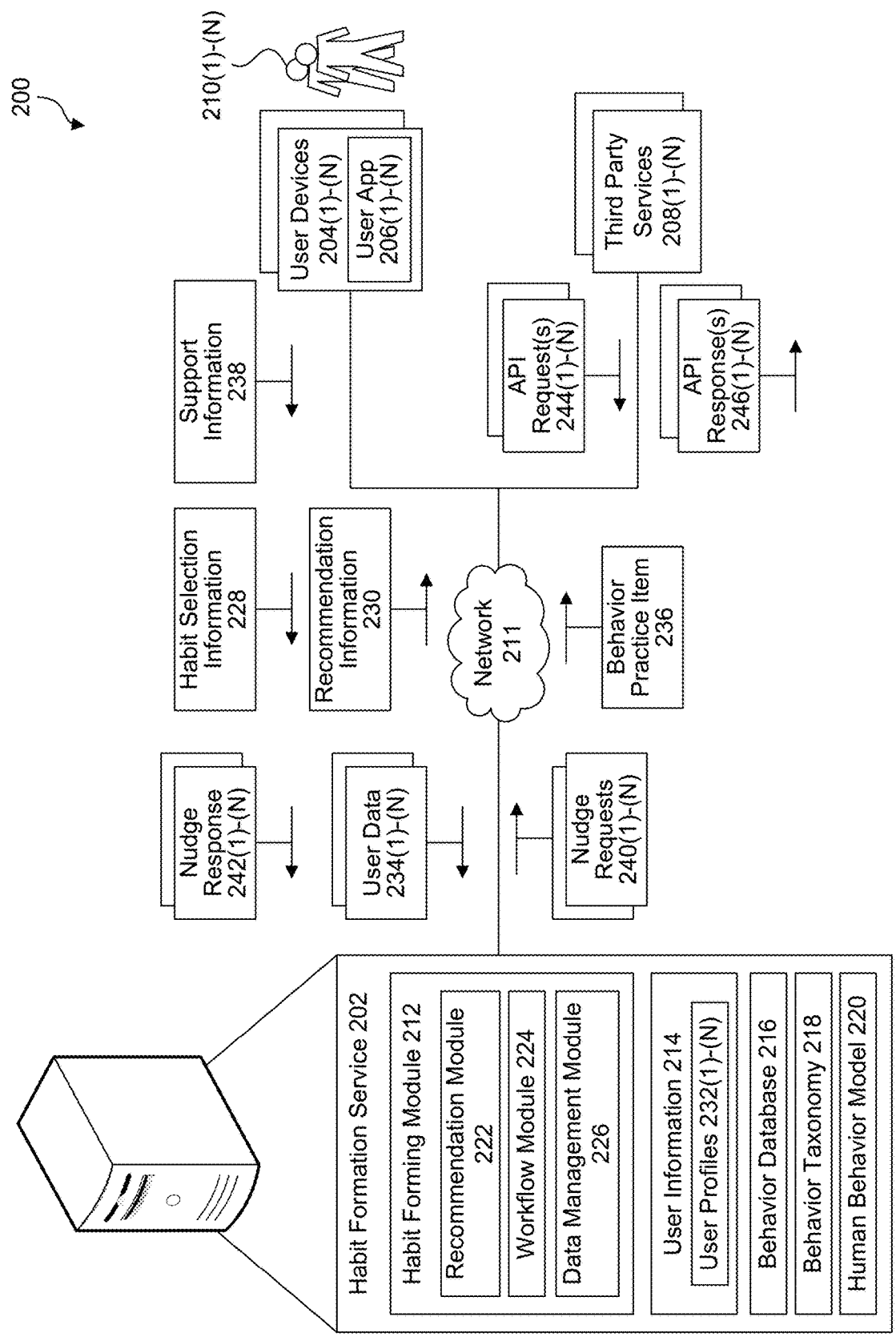
FIG. 2 is a block diagram of an example framework for implementing a habit forming system, according to some embodiments.

FIG. 2 illustrates a block diagram of an example framework for implementing a habit forming system 200, according to some embodiments. As illustrated in FIG. 2, the habit forming system 200 includes a habit forming service (HFS) 202, a plurality of user devices 204(1)-(N) including habit forming applications (HFA) 206(1)-(N), and a plurality of third party services 208(1)-(N). As shown in FIG. 2, the user devices 204 are associated with a plurality of users 210(1)-(N). Further, as described herein, the users 210(1)-(N) may employ at least one of the HFS 202, the HFA 206, or the third party services 208(1)-(N) to form a new habit.

The HFS 202, the HFA 206, and the third-party services 208(1)-(N) may communicate via one or more communication networks 211. The communication network 211 may include any combination of a private network, personal area network (PAN), Local-Area Network (LAN), Wide-Area Network (WAN), or the Internet. Further, the connection between the HFS 202, the HFA 206, and the third-party services 208(1)-(N), and the communication network 211 may be a wireless connection (e.g., Bluetooth, Wi-Fi connection, etc.), or a wired connection (e.g., Ethernet, universal serial bus (USB), etc.), or a combination thereof.

As illustrated in FIG. 2, the HFS 202 may include a habit forming module 212, user information 214, a behavior database 216, a behavior taxonomy 218, and a human behavior model 220. The habit forming module 212 may be configured to manage the habit forming system 200, and assist the users 210(1)-(N) in forming new habits. As described in detail herein, the habit forming module 212 may manage an attempt by a user 210 to form a new habit over a period of time by recommending behaviors the user 210 can practice to form the habit. In some embodiments, the habit forming module 212 may include a recommendation module 222, a workflow module 224, and a data management module 226.

For instance, the HFA 206(1) may send, to the habit forming module 212, habit selection information 228 indicating that the user 210(1) endeavors to form the habit of performing an exercise routine at a frequency of three times a week. In response, the habit forming module 212 may determine one or more recommended behaviors for forming the habit based on the behavior database 216 and the recommendation module 222. For example, the recommendation module 222 may assess the behaviors stored on the behavior database 216, and determine that performing fifteen pushups and fifteen sit-ups before a morning shower should be recommended to the user 210(1).

In some embodiments, the behavior database 216 may store a plurality of prospective behaviors that may be performed by the users 210(1)-(N) to form habits. Further, the behavior database 216 may store relationships between habits and behaviors that may be practiced by the users 210(1)-(N) to form the habits. In some embodiments, the behavior database 216 may store a minimum amount of potential behaviors for forming a particular habit. Further, the behavior database 216 may group habits into collections designed to produce specific outcomes. For example, a collection may include a group of behaviors that, when formed as habits, cause the user 210(1) to lose weight.

As used herein, the term "database" refers to an organized collection of data. In some embodiments, a database may include a plurality of data tables comprising data values (e.g., alphanumeric strings, integers, decimals, floating points, dates, times, binary values, Boolean values, and/or enumerations). Some examples of databases include columnar databases, relational databases, key-store databases, graph databases, and document stores.

Additionally, the recommendation module 222 may identify preparation information corresponding to the recommended behavior and/or selected habit. For example, the recommendation module 222 may determine that the user 210(1) should be instructed to set alarms reminding the user 210(1) to workout at scheduled times, and set reminders to eat and sleep at particular times during the day so the user 210(1) has energy to perform the exercise regimen. Once the recommendation module 222 determines the recommended habit and the corresponding preparation information, the habit forming module 212 may send recommendation information 230 to the HFA 206(1) including the recommended behavior and the preparation information.

In some embodiments, the recommendation module 222 may determine recommended behaviors based upon the user information 214, the behavior taxonomy 218, and the human behavior model 220. As shown in FIG. 2, the user information 214 contains users profiles 232(1)-(N) corresponding to the users 210(1)-(N). For example, the first user profile 232(1) is associated with the first user 210(1), the Nth user profile 232(N) is associated with the Nth user 210(N), and so forth. The user information 214 may include historic habit formation information, habit strength information, historic maturity measurement data, historic nudge information, historic feedback information, historic iteration information, historic iterative competency, user preferences, biographic information, employment information, demographic information, contact information, location information, medical records, wellness data, device collected activity and health information, user feedback, usage history, device information, authentication information, authorization information, etc. As used herein, "iterative competency" may refer to a user's ability to change a behavior if it is not working, such as whether the user can change behaviors easily or whether it is more difficult for the user to change a behavior. Further, in some embodiments, the recommendation module 222 may apply large scale batch processing techniques or large scale stream processing techniques when analyzing the historical habit information of the users 210(1)-(N), As used herein, "habit strength" may refer to a function of the frequency with which an action has been repeated in a stable context and has acquired a high degree of habitual automaticity. In some embodiments, the habit strength may be measured by an assessment collected from the users 210(1)-(N). For instance, the user 210(1) may be presented with an assessment at the end of a predetermined period of time of performing a behavior. Further, the HFS 202 may determine the habit strength of the user 210(1) for the behavior based upon the responses provided to the assessment. In some embodiments, the habit strength may be used as a progress indicator. For example, if the user 210(1) has a habit strength for the behavior above a predetermined value, the user 210(1) may be permitted to progress to performing a new behavior and/or forming a new habit.

The human behavior model 220 may determine maturity measurements for the users 210(1)-(N). In other words, the human behavior model 220 may determine a value representing the ability of the users 210(1)-(N) to effect behavioral change in their respective lives at a specific point in time. In some embodiments, the human behavior model 220 may classify the users 210(1)-(N) within one of a given number of regions, such as four regions. Further, the maturity measurements may reflect discrete positions of the users 210(1)-(N) within one of the four regions of the human behavior model 220. In some embodiments, the human behavior model may employ machine learning techniques and/or pattern recognition techniques to determine the maturity measurements. Further, the human behavior model 220 may include hidden Markov models, decision trees, regression models, support vector machines, or artificial neural networks for determining the maturity measurements.

The following four regions may be used in an embodiment of the invention, although a person of skill in the art will recognize that other, different regions may be identified instead of or in addition to these. In an embodiment, in an initial region, a user may be characterized as lacking confidence and competency with respect to their ability to form a habit. In a second region, a user may be characterized as possessing confidence but lacking competency with respect to their ability to form a habit. In a third region, a user may be characterized as possessing competency but lacking confidence with respect to their ability to form a habit. In a final region, a user may be characterized as possessing both confidence and competency with respect to their ability to form a habit.

As the users 210(1)-(N) employ the habit forming system 200, the habit forming module 212 may monitor and administer the progression and regression of the users 210(1)-(N) between positions within the four regions of the human behavior model 220. For example, the human behavior model 220 may determine that the user 210(1) is currently at a position within the third region based on the user profile 232(1) of the user 210(1). In particular, the human behavior model 220 may determine the maturity measurement (i.e., the current position of the user according to the human behavior model) of the user 210(1) based on historical habit formation information 232(1) describing attempts by the user 210(1) to form new habits using the HFA 206(1) and historic maturity measurement information. Further, as described in detail herein, the recommendation module 222 may employ the human behavior model 220 to identify historical habit information of other users 210(2)-(N) associated with the current position of the user 210(1), and use the identified historical habit information of the other users 210(2)-(N) to determine one or more recommended behaviors for the selected habit.

In some embodiments, the recommendation module 222 may determine a recommended behavior based on at least one of a recommendation score representing an efficacy and/or an availability of a behavior, the maturity measurement of a user, a subject area associated with the selected habit, demographic information corresponding to the user 210(1), user related data (e.g., census data, voting data, shopping data, social media data, subject specific data, etc.), historic habit formation information identifying behaviors that have been unsuccessfully or successfully employed by the users 210(1)-(N), habit strength information identifying the difficulty of performing a behavior, and/or habit strength information identifying a user's ability to perform behaviors that have been identified as difficult.

For instance, the human behavior model 220 may determine that the maturity measurement of the user 210(1) falls within the third region (i.e., possessing competency but lacking confidence). Additionally, the recommendation module 222 may identify other users 210 with a related maturity measurement that have attempted to, in this example, form the habit of performing an exercise routine at a frequency of three times a week, or a related habit in the field of health or physical exercise. In some embodiments, the other users 210 may have the same maturity measurement as the user 210(1). In some other embodiments, the other users 210 may have a maturity measurement within a predetermined range of the maturity measurement of the user 210(1).

Further, the recommendation module 222 may determine behaviors that have been employed by other users 210 having a maturity measurement related to the maturity measurement of the user 210(1). For example, the habit forming module 212 may identify, in this example, that the other users 210 have practiced the behavior of performing fifteen pushups and fifteen sit-ups before a morning shower in order to form the habit of performing an exercise routine at a frequency of three times a week via the user information 214. Additionally in this example, the recommendation module 222 may determine a recommendation score for performing fifteen pushups and fifteen sit-ups before a morning shower for the users 210 having a maturity measurement that falls within the third region.

When calculating the availability component of the recommendation score, the habit forming module 212 may determine the probability that a user 210 at a position within the third region will, in this example, be able to perform fifteen pushups and fifteen sit-ups before a morning shower. In some embodiments, the availability component is based on the user data 234(1)-(N), research information, and/or survey information. When calculating the efficacy component of the recommendation score, the habit forming module 212 may determine the habit formation success rate of users 210 at a position within the third region when attempting to form the habit of, in this example, performing an exercise routine at a frequency of three times a week by practicing the behavior of performing fifteen pushups and fifteen sit-ups before a morning shower. In some embodiments, the efficacy component is based on the user data 234(1)-(N), research information, and/or survey information.

The behavior taxonomy 218 is a model for evaluating behaviors of the behavior database 216. In some embodiments, the behavior taxonomy 218 may include a graph database wherein the vertices represent discrete atomic components of the behaviors, and the edges represent the relationship between the atomic components of the behaviors. Further, the graph database may be optimized for time-stamped or time series data. As used herein, "time series" are measurements or events that are tracked, monitored, downsampled, and aggregated over time. Some examples of a graph database include DataStax Enterprise Graph, TitanDB, Neo4J, OrientDB, BlazeGraph, ArrangoDB, etc. Further, the behavior taxonomy 218 may include a plurality of ranks. For example, in some embodiments, the structure of the behavior taxonomy 218 may include six ranks. For instance, the structure of the behavior taxonomy 218 may include a locus, system, category, manipulation, sub-manipulation, precision, and sub-precision.

The locus rank may represent whether the behavior is external and/or internal to the user 210. For example, performing an exercise regimen may be considered an external act with respect to the user 210(1). In contrast, an internal behavior is a behavior that is performed in the mind of the user 210(1). In some instances, the locus rank may identify the manner in which a user 210(1) will interpret the behavior and process its practice. Further, the locus rank may indicate, to the recommendation algorithm 222, the importance of environmental factors or the relatedness of the behavior to other positive behaviors. The system rank may represent a grouping used by the human brain to understand related concepts. Some examples of external systems include systemization/routines, ease, timing, and environment. Some examples of internal systems include awareness, sensory, intrinsic motivation, etc.

The category rank may represent a category associated with the behavior. Some example categories associated with a behavior include routines, mindfulness, attention, self-imagery, attentiveness, correlations, social characteristics, and relativity. For instance, the category rank may indicate that the behavior involves the user 210(1) performing a daily routine (i.e., daily performance of the exercise regimen consisting of fifteen push-ups and fifteen sit-ups).

The manipulation rank may represent the modification of action that is performed. In some embodiments, example modifications of action include an increase of the behavior, a decrease of the behavior, a conditional behavior (i.e., implementing an if-then relationship between two events), a tracking behavior, a monitoring behavior, a recitation-based behavior, a contemplative behavior, an aspirational behavior, a concentration-based behavior, a ruminating behavior, a repetitive behavior, or a substitution of one behavior for another. For example, the manipulation rank may indicate, in this example, that user 210(1) would like to increase the amount of pushups performed on a daily basis.

The sub-manipulation rank may indicate the quantity or level of the modification of action. For example, the sub-manipulation rank may indicate, in this example, that the user 210(1) would like to perform fifteen push-ups. Some examples of sub-manipulation labels include context cues, data collection, analysis, pattern recognition, identifying positive events, recalling a significant event and/or memory, slogan recitation, engaging in an alternate activity, directing attention to an alternative stimulus, generally redirecting attention, object of focus, profound realization, journaling, self-reflection, prayer, meditation, sharing an emotional experience, inquiry, etc.

The precision rank may represent a specificity of the behavior. For instance, the precision rank may represent temporal and/or performance information associated with the behavior. For instance, the precision rank may represent, in this example, that the performance of the exercise regimen includes a timing component. The sub-precision rank may provide further specificity with respect to the behavior. For example, the sub-precision rank may indicate that the behavior is to be performed, in this example, before the morning shower of the user 210(1).

Some examples of precision labels include physical, emotional, sensory, location, timing, results/feedback, and conscious performance. Furthermore, some examples of sub-precision labels include person, place, object, sight, sound, feel taste, smell, and unconscious performance.

In some embodiments, the recommendation module 222 may leverage the maturity measurement and the recommendation score to determine weighted traversal paths of prospective behaviors over the behavior taxonomy 218. For example, an efficacy score component of a recommendation score may be used to determine weights for the graph elements within the behavior taxonomy 218. As a result, the recommendation module 222 may determine the recommended behaviors by employing graph functions that aggregate and compare weighted components of the behavior taxonomy 218.

Further, the recommendation module 222 may identify the behaviors that are most successful for a particular maturity measurement via the traversal paths and the recommendation scores. Additionally, or alternatively, the recommendation module 222 may identify the behavior elements that are most frequently present in the traversal paths of behaviors found to be successful in forming the selected habit for a particular maturity measurement. In other words, the recommendation module 222 may identify the behavior elements of the behaviors that have the most connections to traversal paths corresponding to behaviors that proved to be highly successful in helping users 210 of a particular maturity measurement form the new habit.

For example, the recommendation module 222 may determine that the most frequently present elements for behaviors successful in forming the selected habit correspond to the vertices of the behavior taxonomy 218 that collectively represent the behavior of, in this example, performing fifteen pushups and fifteen sit-ups before a morning shower. In some embodiments of this example, performance by the user 210(1), performing fifteen pushups, performing fifteen sit-ups, and the performance occurring prior to a morning shower may be individual elements of the behavior and thus individual vertices within the behavior taxonomy 218. Based upon the determination, the recommendation module 222 may recommend in this example that the user 210(1) practice the behavior of performing fifteen pushups and fifteen sit-ups before a morning shower in order to form the habit of performing an exercise routine at a frequency of three times a week.

In some embodiments, the recommendation module 222 may determine a plurality of behaviors to recommend to the user 210(1). For instance, the recommendation module 222 may identify a plurality of behaviors meeting one or more predetermined criteria, and select the identified behaviors for recommendation. In some instances, the predetermined criteria may relate to the attributes of the vertices, edges, or traversal paths corresponding to the identified behaviors.

Once the habit forming module 212 determines the one or more behaviors that should be recommended to the user 210(1), the habit forming module 212 sends recommendation information 230 to the HFA 206(1). The recommendation information 230 may include, in this example, the recommended behavior of performing fifteen pushups and fifteen sit-ups before a morning shower. Further, the HFA 206(1) may present the recommended behavior to the user 210(1).

In addition, the HFA 206(1) may send a behavior practice item 236 indicating that the user 210(1) has selected the recommended behavior for forming the habit of performing an exercise routine at a frequency of three times a week. Further, the HFA 206(1) may send support information 238 to the HFS 202 indicating when the user 210(1) would like to receive support from the habit forming module 212 while practicing the recommended behavior. In some other embodiments, the recommendation module 222 may determine the support information 238 based upon the maturity measurement of the user 210(1), and/or the user information 214. Further, the HFS 202 may send the determined support information 238 with the recommendation information 230. In yet still some other embodiments, the support information 238 may include instructions to perform behaviors correlating to habit strength to increase the habit strength of the users 210(1)-(N).

Upon receipt of the behavior practice item 236 and the support information 238, the workflow module 224 may monitor and administer the attempt by the user 210(1) to practice the behavior of performing fifteen pushups and fifteen sit-ups before a morning shower over a predetermined period of time. For instance, the workflow module 224 may send nudge requests 240 to the HFA 206(1). In some other instances, the workflow module 224 may manage the passive monitoring of the user 210(1) by the HFA 206(1).

For example, the HFA 106 may employ one or more sensors of the user device 204(1) to determine whether the user 210(1) is performing the selected behavior. In some embodiments, the HFA 206(1) may determine the user 210(1) has performed a scheduled workout regimen based on determining that the heart rate of the user 210(1) reflects heart rate activity consistent with performing a workout regimen. In addition, the HFA 206(1) may communicate user data 234(1) to the workflow module 224 indicating the progress of the user 210(1). For example, the HFA 206(1) may send user data 234(1) including heart rate data indicating that the user 210(1) has been practicing the selected behavior.

Further, the workflow module 224 may use the nudge responses 242(1)-(N) and user data 234(1) to determine status information corresponding to the behavior practice item 236. For example, the workflow module 224 may determine whether the behavior has successfully led to formation of the selected habit, determine whether the behavior has not led to formation of the selected habit within the predetermined time, determine whether to recommend a new behavior to the user 210(1) for the next phase of forming the selected habit, or determine whether to recommend an alternative behavior to the user 210(1) for forming the selected habit (i.e., perform an iteration sequence). In some embodiments, the recommendation module 222 or the workflow module 224 may determine when to perform an iteration sequence based on at least one of the status information corresponding to the behavior practice item 236 or the historic iterative competency of the user 210(1). In addition, the workflow module 224 may provide the status information to the data management module 226.

In some embodiments, the workflow module 224 may identify that the user 210(1) has stalled or otherwise been disrupted with respect to the behavior practice item 236. This may occur at any time during the time for practicing the current behavior, not just at the culmination of practicing the current behavior. For example, the nudge responses 242(1)-(N) and user data 234(1) may indicate that the user 210(1) has not recently practiced the selected behavior during a period of time associated with the behavior practice item 236. As a result, the workflow module 224 may send an iteration request to the recommendation module 222. In response to the iteration request, the recommendation module 222 may determine bespoke recommended behaviors for the user 210(1). In some examples, the recommendation module 222 determines the bespoke recommended behaviors based upon the user information 214, the behavior taxonomy 218, the human behavior model 220, the selected behavior of the behavior practice item 236, and/or recommendation scores pertaining to the bespoke recommended behaviors.

Further, the habit forming module 212 may send a nudge request 240 to the user 210(1) indicating that the attempt of the user 210(1) to form the selected habit appears to be disrupted, and suggesting the user 210(1) employ at least one of the bespoke recommended behaviors to attempt to form the selected habit (i.e., iterate on their practice). The process of iteration is influential in helping the user 210(1) build an iterative mindset as opposed to relying on an outcome-based mindset.

In some embodiments, when the recommendation module 222 receives the iteration request with respect to the behavior practice item 236, the recommendation module 222 may determine a modification to the behavior practice item 236 of the user 210(1). For example, the workflow module 224 may identify that the recommended behavior of the behavior practice item 236 is no longer an ideal practice for the user 210(1) based on the behavior taxonomy 218 and/or status information of the behavior practice item 236. As a result, the recommendation module 222 may determine one or more bespoke recommended behaviors for the user 210(1) to practice to form the selected habit of the behavior practice item 236. In some embodiments, the recommendation module 222 may identify one or more behavior elements of the recommended behavior that have failed the user 210(1) based on the behavior taxonomy 218, and replace the behavior elements within the recommended behavior to determine a bespoke recommended behavior for forming the selected habit of the behavior practice item 236. In addition, as described in detail above, the HFS 202 may send the bespoke recommended behavior with corresponding preparation information to the HFA 206(1) in a nudge request 240.

Further, the recommendation module 222 may determine the next behavior practice item the user 210(1) should practice in order to form the selected habit. For example, the workflow module 224 may identify that the behavior practice item 236 has expired. In addition, the recommendation module 222 may determine a new behavior practice item for continuing the attempt by the user 210(1) to form the selected habit of the behavior practice item 236. Additionally, the recommendation module 222 may recommend preparation information for continuing the attempt, identify one or more individuals that may be able to assist the user 210(1) in practicing productive behaviors related to the selected habit, and identify, based on the behavior taxonomy 218, one or more behavior elements of the recommended behavior of the behavior practice item 236(1) that have significantly failed or supported the user 210(1).

As illustrated in FIG. 2, the user devices 204(1)-(N) and the third party services 208(1)-(N) may send user data 234(1)-(N) to the HFS 202. The user data 234(1)-(N) may include any and all information pertaining to user activity and behavior. For example and without limitation, the user data 234(1)-(N) may include historic habit formation information, historic maturity measurement data, historic nudge information, historic feedback information, historic iteration information, historic iterative competency, user preferences, biographic information, employment information, demographic information, contact information, location information, medical records, wellness data, device collected activity and health information, user feedback, usage history, device information.

Further, the data management module 226 may manage receipt and processing of the habit selection information 228, behavior practice items (e.g., behavior practice item 236, status information corresponding to the behavior practice item 236, and/or iteration requests corresponding to the behavior practice item 236), support information (e.g., support information 238)), the nudge responses 242(1)-(N), and/or the user data 234(1)-(N) within the system 200. In some embodiments, the data management module 226 may update the user information 214, behavior taxonomy 218, human behavior model 220, or behavior database 216 based at least in part on the habit selection information 228, behavior practice items (e.g., behavior practice item 236), support information (e.g., support information 238)), the nudge responses 242(1)-(N), and/or the user data 234(1)-(N).

For example, the data management module 226 may update the efficacy score of a behavior based on at least one of a nudge response 242 indicating a negative or positive review of the behavior, a nudge response 242 indicating that the user 210(1) promptly responded to a nudge request 240, or the user 210(1) selecting a new behavior for forming the habit. As another example, the data management module 226 may update the availability score of a behavior based on at least one of the behavior practice item 236 indicating the user 210(1) has selected the behavior to practice to form a habit, or a nudge response 242 indicating that the user 210(1) promptly responded to a nudge request 240. As yet still another example, the data management module 226 may update the user information 214 or behavior taxonomy 218 based on at least one of a nudge response 242 indicating a negative or positive review of the behavior, the user data 234(1) indicating that the user 210(1) has continuously performed the selected behavior, or the user data 234(1) or nudge responses 242 indicating that the user successfully formed the habit.

In addition, the data management module 226 may generate and train the human behavior model. For example, the data management module may train the human behavior model 220 based at least in part on the habit selection information 228, behavior practice items (e.g., behavior practice item 236, status information corresponding to the behavior practice item 236, and/or iteration requests corresponding to the behavior practice item 236), support information (e.g., support information 238)), the nudge responses 242(1)-(N), and/or the user data 234(1)-(N) within the system 200.

As illustrated in FIG. 2, the third party services 208(1)-(N) may send API requests 244(1)-(N) to the HFS 202 and receive API responses 246(1)-(N) from the HFS 202. In some embodiments, the third party services 208(1)-(N) may employ the HFS 202 to provide habit related services to the users 210(1)-(N). For example, a third party service 208(1) may provide habit forming services to a group of users 210 having a special relationship with the third party service 208(1). Some examples of third party services may include health care providers, health insurance companies, web server applications, application developers, employers, government institutions, educational institutions, etc.

Figure 3:
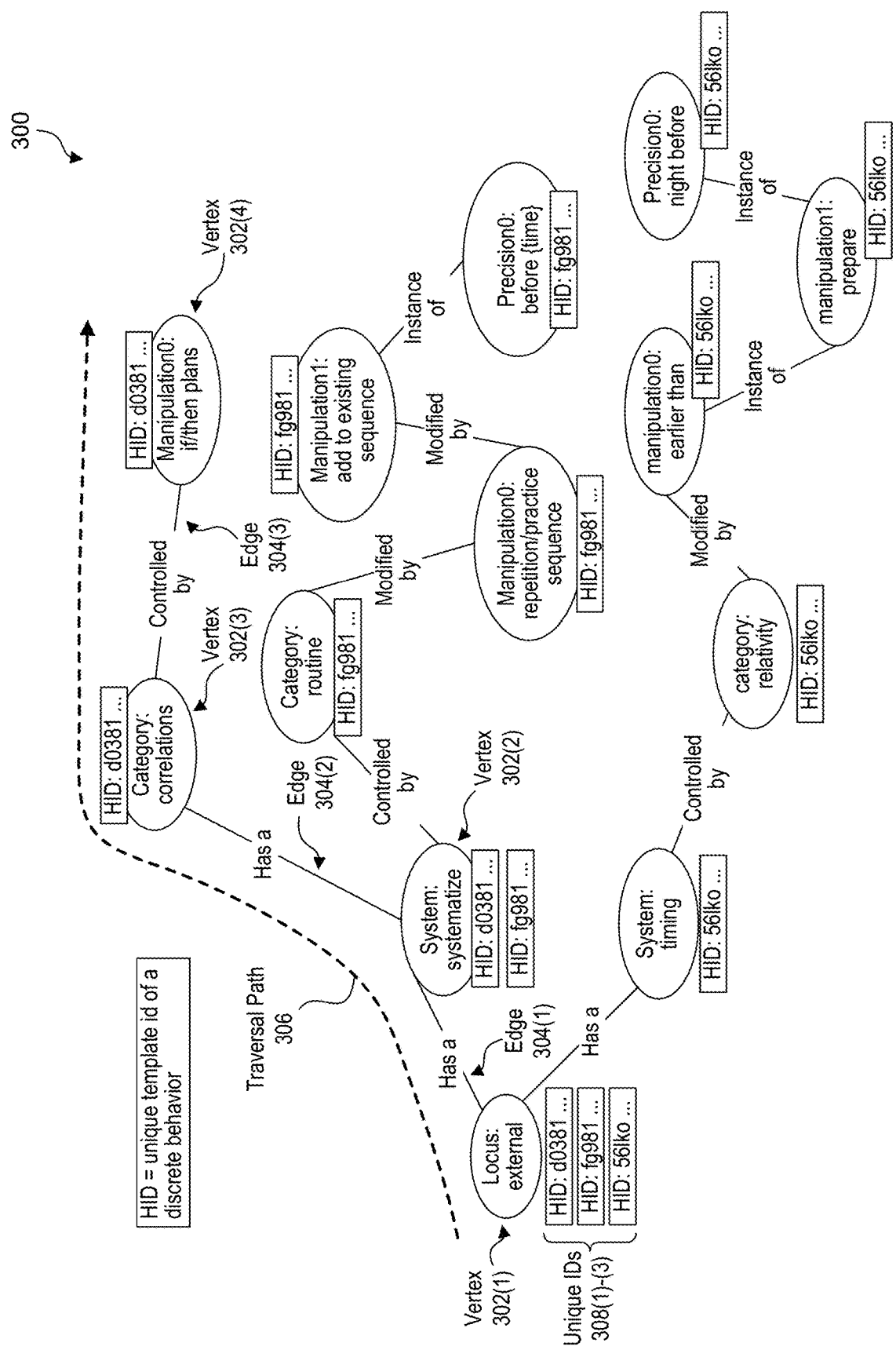
FIG. 3 illustrates graph data structures representing a behavior taxonomy, according to embodiments of the present disclosure.

FIG. 3 illustrates graph data structures representing a behavior taxonomy, according to embodiments of the present disclosure. As illustrated in FIG. 3, a behavior taxonomy 300 (e.g., the behavior taxonomy 218) may be stored as a graph data structure including vertices 302(1)-(4), edges 304(1)-(3), and a traversal path 306.

In some embodiments, each vertex 302 may correspond to a behavior element classified under a rank (e.g., locus, system, category, manipulation, sub-manipulation, precision, and sub-precision) of the behavior taxonomy 300. Further, an individual vertex 302 may be tagged with unique identifiers 308 of behaviors including the behavior element. As shown in FIG. 3, the vertex 302(1) is tagged with the unique identifiers 308(1)-(3) of three different behaviors that include the behavior element corresponding to the vertex 302(1).

Further, each edge 304 may correspond to a relationship between two vertices 302. For example, the edge 304(1) represents a "has a" relationship between the vertex 302(1) corresponding to a first behavior element and the vertex 302(2) corresponding to a second behavior element. Some other examples of edge relationships include "modified by," "controlled by," "instance of," "reinforced by," "regressed by," "requires," and "contains." Additionally, the traversal path 306 may correspond to a behavior comprising the behavior elements corresponding to the vertices 302(1)-(4). As such, the traversal path 306 is an encoded representation of the behavior over the behavior taxonomy. As illustrated in FIG. 3, the traversal path 306 may traverse the vertices 302(1)-(4) having the unique identifier 308(1) of a behavior. Furthermore, as described in detail herein, one or more attributes of the traversal path 306 may be used to determine whether the behavior corresponding to the traversal path 306 should be recommend to a user (e.g., the user 210(1)).

As an example, the recommendation module 222 may generate the traversal path 306 corresponding to, in this example, performing fifteen pushups and fifteen sit-ups before a morning shower using the behavior taxonomy 300. In some examples, the attributes may include at least one of the vertices 302(1)-(4) or the edges 304(1)-(3) of the traversal path 306 being frequently found in behaviors that have historically helped users 210(1)-(N) form the selected habit, at least one of the vertices 302(1)-(4) or the edges 304(1)-(N) of the traversal path 306 being frequently found in behaviors that have historically helped users 210(1)-(N) form habits associated with the selected habit (e.g., similar subject area), the absence of one or more vertices 302(1)-(4) or edges 304(1)-(3) frequently found in behaviors that have historically been unhelpful to users 210(1)-(N) attempting to form the selected habit, the traversal path 306 indicating that the behavior is frequently successful in helping the users 210(1)-(N) form the habit, and/or the traversal path 306 indicating that the behavior is frequently successful in helping the users 210(1)-(N) form habits associated with the selected habit (e.g., similar subject area).

In some instances, encoding a behavior onto the behavior taxonomy may result in a plurality of traversal paths over the behavior taxonomy for the behavior. In some embodiments, the traversal paths may be combined into a pathway associated with the behavior. Further, as described herein, the components of the recommendation score may be used to determine weights along the pathway. For instance, as described herein, efficacy scores may be used to determine weights for the graph elements along the pathway. In addition, in some embodiments, the weights may differ based upon the maturity measurement of a user. For example, the efficacy scores along a traversal path may be higher when the user has a higher maturity measurement.

Additionally, the recommendation module 222 may identify the preferred behavior by identifying an optimal and/or efficient traversal path along the pathway. In some examples, the recommendation engine 222 may determine an optimal and/or efficient traversal path by performing a route optimization algorithm to identify a shortest or least-cost traversal path of the pathway. Further, the optimal traversal route along the pathway may be continuously updated by the HFS 202 to dynamically optimize the preferred behavior for forming a habit.

In some embodiments, a HFS (e.g., the HFS 202) may encode the behaviors of the behavior database (e.g., the behavior database 216) onto the behavior taxonomy 300. As an example, a behavior including performing a daily calisthenics routine (e.g., fifteen pushups and fifteen sit-ups) prior to a morning shower may be encoded onto the behavior taxonomy 300. Given that the performance of calisthenics is an act external to a user, the encoding process may include creating an association between an identifier of the behavior and a locus rank node of the behavior taxonomy 300 for external behaviors. If the graph data structure does not include a locus rank node for external behaviors, a locus rank node may be added to the graph data structure and the identifier of the behavior may be associated with the newly-added locus rank node.

Further, given that the behavior includes routine performance, the encoding process may further include creating an association between an identifier of the behavior and a system rank node for systemization/routine behaviors. The system rank node should also have an edge relationship with the locus rank node to represent that the calisthenics routine is an external behavior. If the graph data structure does not include a system rank node for routine performance of external behaviors, the graph data structure may be updated to include a system rank node for routine performance of an external behavior. For instance, the graph data structure may be updated to include a system rank node for routine behaviors, the system rank node having an edge relationship with the locus rank node for external behaviors. Additionally, an identifier of the behavior may be associated with the newly-added system rank node.

Further, given that the behavior routine includes daily performance of a calisthenics routine, the encoding process may further include creating an association between an identifier of the behavior and a category rank node for daily routines. The category rank node should also have an edge relationship with the system rank node to represent that the daily calisthenics routine is the routine performance of an external behavior. If the graph data structure does not include a category rank node for the daily performance of an external routine, the graph data structure may be updated to include a category rank node for the daily performance of an external routine. For instance, the graph data structure may be updated to include a category rank node for daily routines, the category rank node having an edge relationship with the system rank node for routine performance of an external behavior. Additionally, an identifier of the behavior may be associated with the newly-added category rank node.

Further, given that the behavior includes the modification of an action (i.e. increasing physical activity), the encoding process may further include creating an association between an identifier of the behavior and a manipulation rank node for increasing the number of pushups and sit-ups performed. The manipulation rank node should also have an edge relationship with the category rank node to represent that the calisthenics routine is a modification of a daily routine. If the graph data structure does not include a manipulation rank node for modifying daily routines, the graph data structure may be updated to include a manipulation rank node for modifying daily routines. For instance, the graph data structure may be updated to include a manipulation rank node for increasing the number of pushups and sit-ups performed, the manipulation rank node having an edge relationship with the category rank node for the daily performance of an external routine. Additionally, an identifier of the behavior may be associated with the newly-added category rank node. In some embodiments, the manipulation rank node may also have an edge relationship with a sub-manipulation rank node. The sub-manipulation rank node may represent the amount of pushups and sit-ups (e.g., fifteen pushups and sit-ups) being performed during the calisthenics routine. In addition, the encoding process may include associating the identifier of the behavior with the sub-manipulation rank node.

Further, given that the behavior includes a time component (i.e. performing the calisthenics regime in the morning), the encoding process may further include creating an association between an identifier of the behavior and a precision rank node for performing behaviors in the morning. The precision rank node should also have an edge relationship with the sub-manipulation rank node to represent that the increase in the performance of calisthenics is performed in the morning. If the graph data structure does not include a precision rank node for performing behaviors in the morning, the graph data structure may be updated to include a precision rank node for performing behaviors in the morning. For instance, the graph data structure may be updated to include a precision rank node for performing a behavior in the morning, the precision rank node having an edge relationship with the sub-manipulation rank node for performing fifteen pushups and sit-ups. Additionally, an identifier of the behavior may be associated with the newly-added precision rank node. In some embodiments, the precision rank node may also have an edge relationship with a sub-precision rank node. The sub-precision rank node may represent that the calisthenics routine is to be performed prior to a morning shower. In addition, the encoding process may include associating the identifier of the behavior with the sub-precision rank node.

As mentioned above, many recommendation engines fail to identify behaviors for successfully establishing a habit, and the components of behaviors that are critical in helping users establish a habit. Embodiments herein address these challenges by performing large scale data analysis over user information (e.g., the user information 112 or the user information 214) to build a behavior taxonomy (e.g., the behavior taxonomies 218 and 300) encoding the behaviors of the behavior database 216, and generating traversal paths (e.g., the traversal path 306) over the behavior taxonomy to identify behaviors that have historically helped users 210 (1)-(N) form the selected habit. In addition, as described above, the traversal paths may identify atomic components frequently found in behaviors successful in assisting a user in forming a habit. In response, the HFS 102 may dynamically generate new behaviors within the behavior database 216 composed of the atomic components. Further, as described above, the traversal paths may be used to identify atomic components frequently found in behaviors unsuccessful in assisting a user in forming a habit. In response, the HFS 102 may dynamically disqualify behaviors that include the identified atomic components from consideration by the recommendation module 222.

Figure 4:
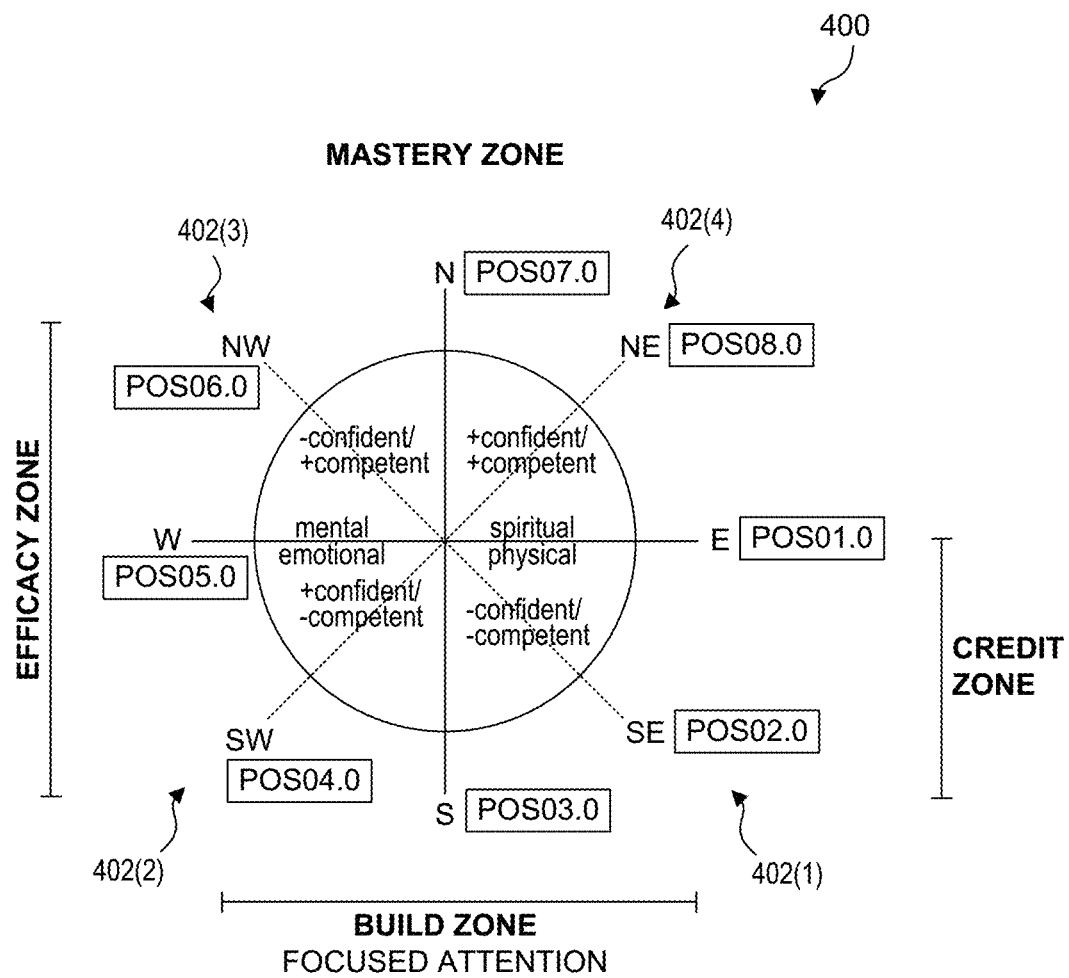
FIG. 4 illustrates user regions of a human behavior model, according to embodiments of the present disclosure.

FIG. 4 illustrates example user regions of a human behavior model, according to embodiments of the present disclosure. As described in detail herein, the four user regions 402(1)-(4) may indicate the ability of a user to form a habit by implementing a behavioral change. The initial user region 402(1) may represent users lacking confidence and competency with respect to their ability to form a habit. The second user region 402(2) may represent users possessing confidence but lacking competency with respect to their ability to form a habit. The third user region 402(3) may represent users possessing competency but lacking confidence with respect to their ability to form a habit. The final user region 402(4) may represent users possessing both confidence and competency with respect to their ability to form a habit.

As described herein, a human behavior model (e.g., the human behavior model 220) may determine a maturity measurement value for a user (e.g., user 210(1)). In some embodiments, the maturity measurement value represents a positional code identifying the current position of the user within one of the four regions 402(1)-(4). As illustrated in FIG. 4, each cardinal direction and intercardinal direction may represent a different positional code within the four regions 402(1)-(4) of the human behavior model.

For example, positional code 1.0 may represent the cardinal direction east, the positional code 2.0 may represent the intercardinal direction southeast, the positional code 3.0 may represent the cardinal direction south, the positional code 4.0 may represent the intercardinal direction southwest, the positional code 5.0 may represent the cardinal direction west, the positional code 6.0 may represent the intercardinal direction northwest, the positional code 7.0 may represent the cardinal direction north, and the positional code 8.0 may represent the intercardinal direction northeast.

Figure 5:
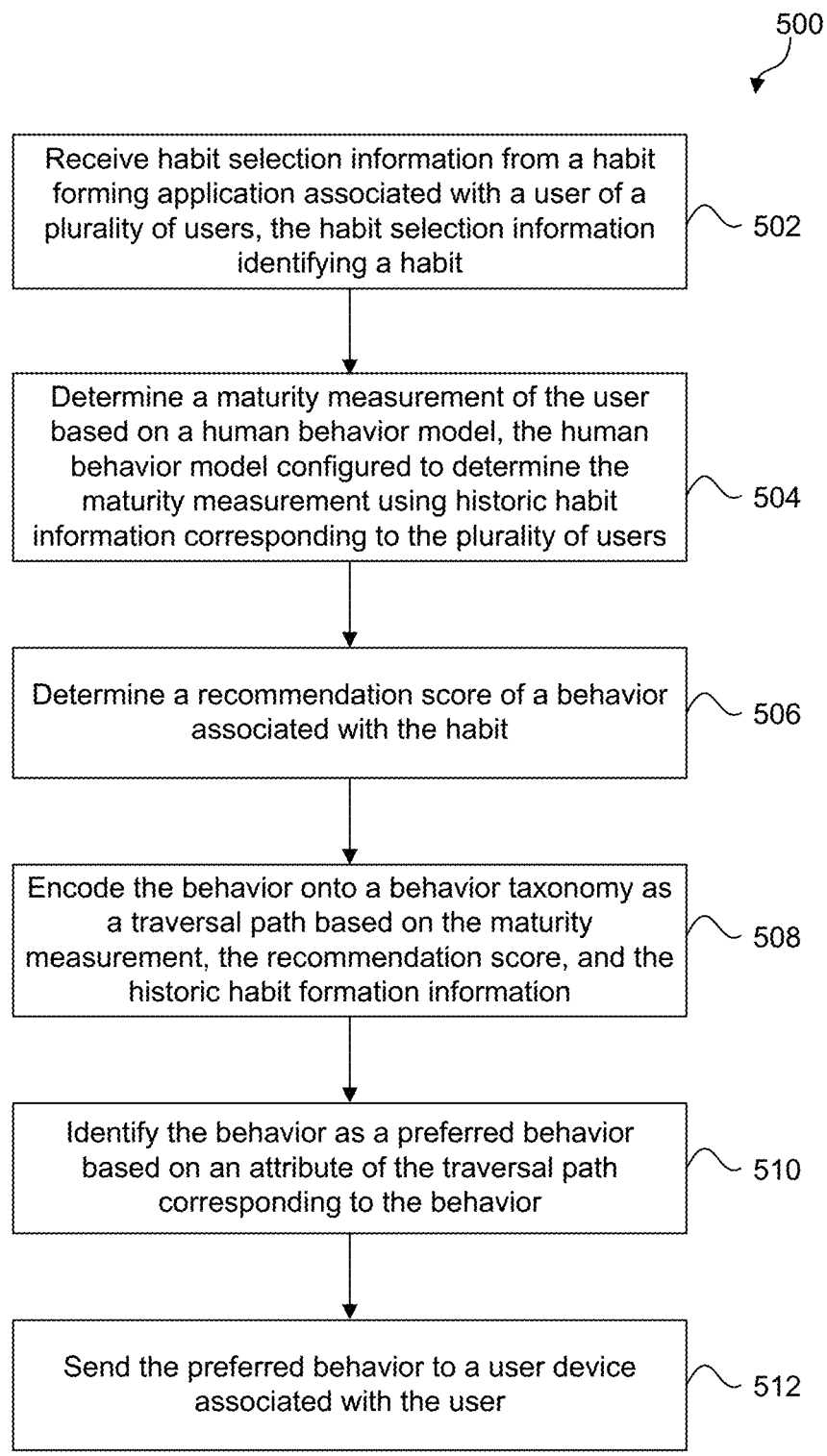
FIG. 5 is a flowchart illustrating a process for determining a recommended behavior, according to some embodiments.

FIG. 5 is a flowchart for a method 500 for determining a recommended behavior, according to an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 2-3. However, method 500 is not limited to that example embodiment.

At 502, a habit forming service may receive habit selection information from a habit forming application associated with a user, the habit selection information identifying a habit. For example, the HFS 202 may receive the habit selection information 228 from the HFA 206(1). Further, the habit selection information 228 may identify that the user 210(1) would like to form the habit of, in this example, performing an exercise routine at a frequency of three times a week.

At 504, a habit forming service may determine a maturity measurement of the user based on a human behavior model. For example, the recommendation module 222 may determine that the user 210(1) is currently in a third region of the human behavior model 220.

At 506, a habit forming service may determine a recommendation score of a behavior associated with the habit. For example, the recommendation module 222 may determine an availability score and an efficacy score for, in this example, performing fifteen pushups and fifteen sit-ups before a morning shower.

At 508, a habit forming service may encode the behavior onto a behavior taxonomy as a traversal path based on the maturity measurement, the recommendation score, and historic habit formation information. For example, the recommendation module 222 may generate the traversal path 306 corresponding to, in this example, performing fifteen pushups and fifteen sit-ups before a morning shower using the behavior taxonomy 218. In some embodiments, encoding the behavior on the behavior taxonomy may generate a pathway over the behavior taxonomy.

At 510, the habit forming service may identify the behavior as a preferred behavior based on an attribute of the traversal path corresponding to the behavior. For example, the recommendation module 222 may determine that, in this example, performing fifteen pushups and fifteen sit-ups before a morning shower should be recommended to the user 210(1) based on the attributes of the graph elements (e.g., 302(1)-(4) and 304(1)-(3)) of the traversal path 306 corresponding to the behavior.

In some examples, the attributes may include at least one of the vertices 302(1)-(4) or the edges 304(1)-(3) of the traversal path 306 being frequently found in behaviors that have historically helped users 210(1)-(N) form the selected habit, at least one of the vertices 302(1)-(4) or the edges 304(1)-(N) of the traversal path 306 being frequently found in behaviors that have historically helped users 210(1)-(N) form habits associated with the selected habit (e.g., similar subject area), the absence of one or more vertices 302(1)-(4) or edges 304(1)-(3) frequently found in behaviors that have historically been unhelpful to users 210(1)-(N) attempting to form the selected habit, the traversal path 306 indicating that the behavior is frequently successful in helping the users 210(1)-(N) form the habit, and/or the traversal path 306 indicating that the behavior is frequently successful in helping the users 210(1)-(N) form habits associated with the selected habit (e.g., similar subject area).

As described in detail herein, the encoded representations of a plurality of behaviors corresponding to a habit provide the recommendation module 222 with the ability to identify the best fit behaviors for the user 201(1). In addition, the encoded representations provide the recommendation module 222 with the ability to identify the behavior elements of a behavior that are critical to success or failure of an attempt to form a habit. As such, the recommendation module 222 is capable of adopting a habit-based approach best suited for assisting users to adopt a lifestyle change.

In some embodiments, the recommendation module 222 may determine the preferred behavior based on a pathway including the traversal path 306. For example, the recommendation module 222 may determine that the traversal path 306 is the optimal route along a pathway corresponding to the behavior. In some examples, the recommendation engine 222 may determine the traversal path 306 by performing a route optimization algorithm to identify a shortest or least-cost traversal path along the pathway.

At 512, the habit forming service may send the preferred behavior to a user device associated with the user. For example, the HFS 202 may send the recommendation information 230 to the user device 204(1).

Figure 6:
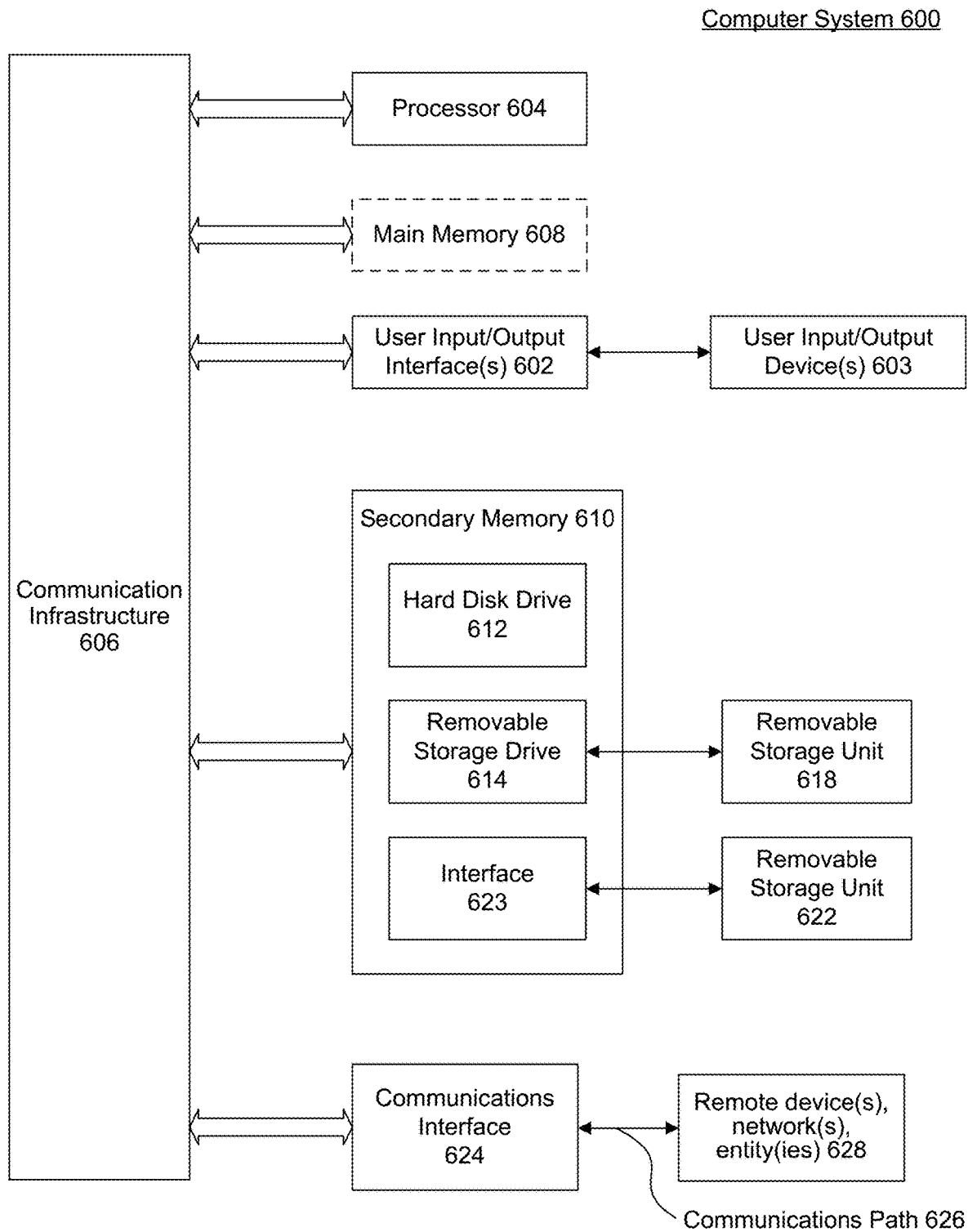
FIG. 6 is an example computer system useful for implementing various embodiments.

Various embodiments may be implemented, for example, using one or more computer systems, such as computer system 600 shown in FIG. 6. One or more computer systems 600 may be used, for example, to implement embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc. The GPU may be particularly useful in evaluating taxonomies and identifying traversal paths as described above.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software; "as a service" models; and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments.

What is claimed is:

1. A method comprising:
   receiving habit selection information from a habit forming application associated with a user of a plurality of users, the habit selection information identifying a habit;
   determining a maturity measurement of the user based on a human behavior model, the human behavior model comprising a machine learning model that is trained to determine the maturity measurement of the user based on historic habit information corresponding to the plurality of users;
   determining a recommendation score of a behavior associated with the habit;
   encoding the behavior onto a behavior taxonomy as a traversal path based on the maturity measurement, the recommendation score, and the historic habit formation information, wherein:
      the behavior taxonomy is a graph data structure having graph elements including vertices, edges, and a plurality of possible traversal paths,
      graph elements along the traversal path are weighted based on at least the maturity measurement, and
      encoding the behavior onto the behavior taxonomy comprises:
         generating a directed graph structure including a first node corresponding to a first component of the behavior and a second node corresponding to a second component of the behavior, the first node and the second node connected by an edge representing a relationship between the first component and the second component; and
         generating the traversal path from the first node to the second node via the edge, wherein the generating the traversal path comprises performing a route optimization algorithm that identifies the traversal path as a shortest or least-cost traversal path;
   identifying the behavior as a preferred behavior based on an attribute of the traversal path corresponding to the behavior and the identification of the traversal path as the shortest or least-cost traversal path; and
   sending the preferred behavior to a user device associated with the user.

2. The method of claim 1, wherein determining the maturity measurement comprises:
   determining a position within a region of the human behavior model, the position indicating an ability of the user to effect behavioral change; and
   determining the maturity measurement based at least in part on the position within the region.

3. The method of claim 1, wherein determining the maturity measurement comprises:
   collecting user information associated with the user;
   updating a position associated with the user from a first region within the human behavior model to a second region within the human behavior model based on the user information, the position indicating an ability of the user to effect behavioral change; and
   determining the maturity measurement based at least in part on the position within the region.

4. The method of claim 1, wherein the user is a first user, and determining the recommendation score comprises:
   identifying a second user based on the maturity measurement;
   determining an availability value based on a probability of the second user performing the behavior; and
   calculating the recommendation score based on the availability value.

5. The method of claim 1, wherein the user is a first user, the graph elements along the traversal path are weighted based on at least an efficacy value and the maturity measurement, and determining the recommendation score comprises:
   identifying a second user based on the maturity measurement;
   determining the efficacy value based on an attempt of the second user to form the habit by performing the behavior; and
   calculating the recommendation score based on the efficacy value.

6. The method of claim 1, further comprising applying a weight to the edge representing the relationship between the first component and the second component, the weight associated with the recommendation score.

7. The method of claim 1, further comprising:
   identifying preparation information associated with the habit, the preparation information including a discrete behavior to perform prior to forming the habit; and
   sending the preparation information to the user device.

8. The method of claim 1, further comprising at least one of:
   sending, to the user device associated with the user, a nudge request including information associated with the preferred behavior; or
   receiving, from the user device associated with the user, a nudge response indicating whether the user has performed the preferred behavior.

9. A non-transitory computer-readable device having instructions stored thereon that, when executed by at least one computing device, cause the at least one computing device to perform operations comprising:

receiving habit selection information from a habit forming application associated with a user of a plurality of users, the habit selection information identifying a habit;

determining a maturity measurement of the user based on a human behavior model, the human behavior model comprising a machine learning model that is trained to determine the maturity measurement of the user based on historic habit information corresponding to the plurality of users;

determining a recommendation score of a behavior associated with the habit;

encoding the behavior onto a behavior taxonomy as a traversal path based on the maturity measurement, the recommendation score, and historic habit formation information corresponding to the plurality of users, wherein:

the behavior taxonomy is a graph data structure having graph elements including vertices, edges, and a plurality of possible traversal paths, graph elements along the traversal path are weighted based on at least the maturity measurement, and encoding the behavior onto the behavior taxonomy comprises:

generating a directed graph structure including a first node corresponding to a first component of the behavior and a second node corresponding to a second component of the behavior, the first node and the second node connected by an edge representing a relationship between the first component and the second component; and generating the traversal path from the first node to the second node via the edge, wherein the generating the traversal path comprises performing a route optimization algorithm that identifies the traversal path as a shortest or least-cost traversal path;

identifying the behavior as a preferred behavior based on an attribute of the traversal path corresponding to the behavior and the identification of the traversal path as the shortest or least-cost traversal path; and sending the preferred behavior to a user device associated with the user.

10. The non-transitory computer-readable device of claim 9, wherein determining the maturity measurement comprises:

determining a position within a region of the human behavior model, the position indicating an ability of the user to effect behavioral change; and determining the maturity measurement based at least in part on the position within the region.

11. The non-transitory computer-readable device of claim 9, wherein determining the maturity measurement comprises:

collecting user information associated with the user;

updating a position associated with the user from a first region within the human behavior model to a second region within the human behavior model based on the user information, the position indicating an ability of the user to effect behavioral change; and determining the maturity measurement based at least in part on the position within the region.

12. The non-transitory computer-readable device of claim 9, wherein the user is a first user, and determining the recommendation score comprises:

identifying a second user based on the maturity measurement;

determining an availability value based on a probability of the second user performing the behavior; and calculating the recommendation score based on the availability value.

13. The non-transitory computer-readable device of claim 9, wherein the user is a first user, the graph elements along the traversal path are weighted based on at least an efficacy value and the maturity measurement, and determining the recommendation score comprises:

identifying a second user based on the maturity measurement;

determining the efficacy value based on an attempt of the second user to form the habit by performing the behavior; and calculating the recommendation score based on the efficacy value.

14. A system comprising:

a memory including historic habit formation information associated with a plurality of users, and a behavior database including a behavior associated with the habit; and one or more processors and/or circuits coupled to the memory and configured to:

train a machine learning human behavior model based on historic habit information corresponding to the plurality of users;

receive habit selection information from a habit forming application associated with a user of the plurality of users, the habit selection information identifying the habit;

deteimine a maturity measurement of the user based on the trained machine learning human behavior model;

determine a recommendation score of the behavior associated with the habit;

encode the behavior onto a behavior taxonomy as a traversal path based on the maturity measurement, the recommendation score, and the historic habit formation information corresponding to the plurality of users, wherein: the behavior taxonomy is a graph data structure having graph elements including vertices, edges, and a plurality of possible traversal paths, graph elements along the traversal path are weighted based on at least the maturity measurement, and to encode the behavior onto the behavior taxonomy, the one or more processors and/or circuits are configured to:

generate a directed graph structure including a first node corresponding to a first component of the behavior and a second node corresponding to a second component of the behavior, the first node and the second node connected by an edge representing a relationship between the first component and the second component; and generate the traversal path from the first node to the second node via the edge;

identify the behavior as a preferred behavior based at least on an attribute of the traversal path corresponding to the behavior;

send the preferred behavior to a user device associated with the user; and perform a route optimization algorithm that identifies the traversal path as a shortest or least- cost traversal path; and wherein the one or more processors and/or circuits are configured to identify the behavior as the preferred behavior based on the attribute of the traversal path corresponding to the behavior and the identification of the traversal path as the shortest or least-cost traversal path.

15. The system of claim 14, wherein to determine the maturity measurement, the one or more processors and/or circuits are further configured to:
    determine a position within a region of the human behavior model, the position indicating and ability of the user to effect behavioral change; and
    determine the maturity measurement based at least in part on the position within the region.

16. The system of claim 14, wherein the one or more processors and/or circuits are further configured to:
    apply a weight to the edge representing the relationship between the first component and the second component, the weight associated with the recommendation score.

17. The system of claim 14, wherein at least one of the first node or the second node has a locus rank, a system rank, a category rank, a manipulation rank, or a precision rank.

18. The method of claim 1, further comprising:
    receiving data from one or more sensors associated with the user; and
    determining whether the user is performing the behavior based on the received data.

19. The method of claim 18, further comprising:
    determining, based on the received data, whether the behavior has successfully led to formation of a habit corresponding to the habit selection information.

20. The non-transitory computer-readable device of claim 9, the operations further comprising:
    receiving data from one or more sensors associated with the user; and
    determining whether the user is performing the behavior based on the received data.

21. The non-transitory computer-readable device of claim 20, the operations further comprising:
    determining, based on the received data, whether the behavior has successfully led to formation of a habit corresponding to the habit selection information.

22. The system of claim 14, the one or more processors and/or circuits further configured to:
    receive data from one or more sensors associated with the user; and
    determine whether the user is performing the behavior based on the received data.

23. The system of claim 22, the one or more processors and/or circuits further configured to:
    determine, based on the received data, whether the behavior has successfully led to formation of a habit corresponding to the habit selection information.

24. The method of claim 1, further comprising:
    training the human behavior model based on the historic habit information corresponding to the plurality of users.

25. The non-transitory computer-readable device of claim 9, wherein the operations further comprise:
    training the human behavior model based on the historic habit information corresponding to the plurality of users.

* * * * *